United States Patent [19]

Langley

[11] Patent Number: 4,683,593
[45] Date of Patent: Aug. 4, 1987

[54] PROTECTIVE GARMENT
[75] Inventor: John D. Langley, Guntersville, Ala.
[73] Assignee: Kappler, Inc., Guntersville, Ala.
[21] Appl. No.: 788,321
[22] Filed: Oct. 17, 1985
[51] Int. Cl.4 ............................................. A41B 11/00
[52] U.S. Cl. ............................................. 2/82; 2/275
[58] Field of Search ................................. 2/79, 82, 275
[56] References Cited
U.S. PATENT DOCUMENTS
3,026,225  3/1962  Ostby ...................................... 2/275
4,272,851  6/1981  Goldstein ................................. 2/82

Primary Examiner—Doris L. Troutman
Attorney, Agent, or Firm—C. A. Phillips

[57] ABSTRACT

A protective garment of layered material in which an inner layer is spun bonded olefin and an outer layer is of a bondable film. Seams are constructed by overlapping regions of material with an outside and inside surface adjacent, and by bonding via the continuous application of ultrasonic heating and spaced application of pressure.

11 Claims, 8 Drawing Figures

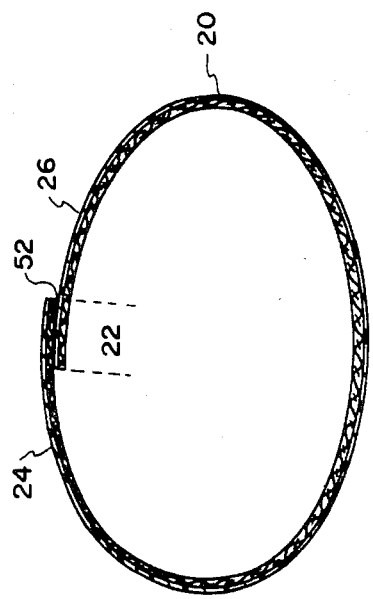
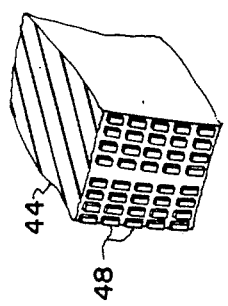
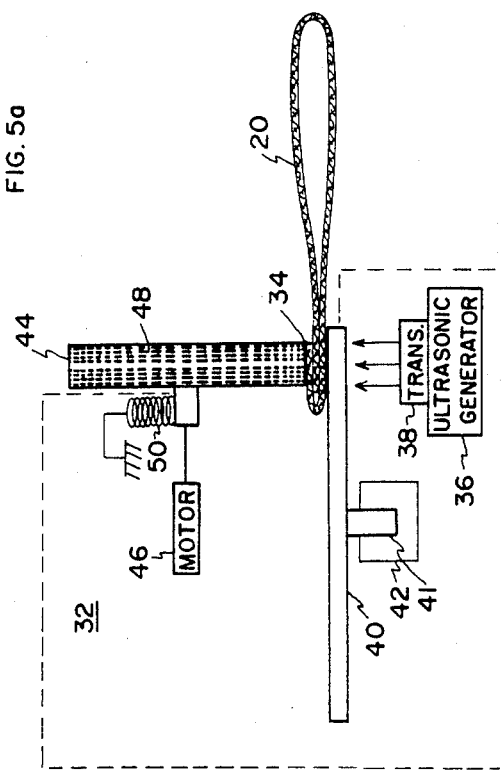
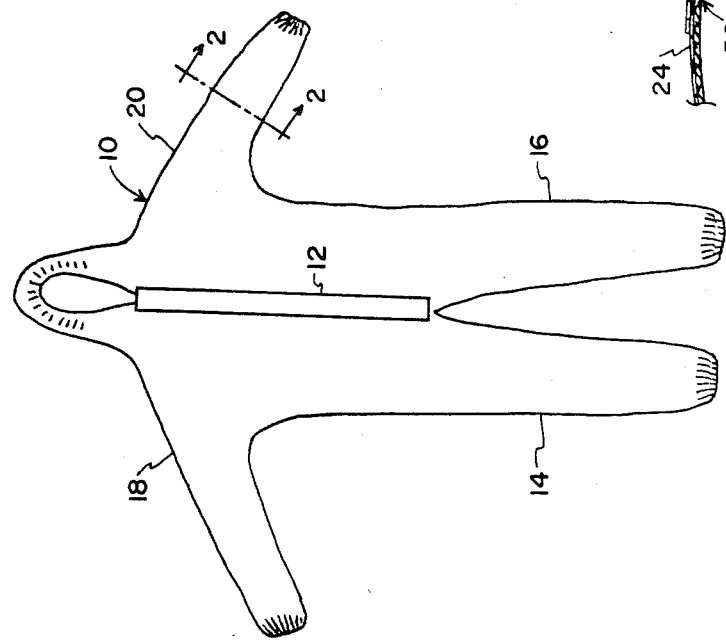
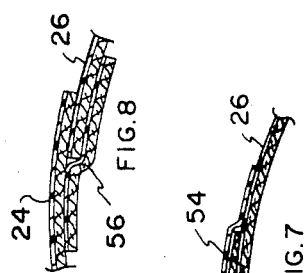

PROTECTIVE GARMENT

BACKGROUND OF THE INVENTION

1. Field of the Invention

This invention relates generally to hazardous environmental suits used to protect workers in contaminated areas, and particularly to a throw-away type such suit.

2. Description of Related Prior Art

Goldstein U.S. Pat. No. 4,272,851 is perhaps best illustrative of the prior art. It discloses a protective suit or garment constructed of a non-woven, spun bonded olefin manufactured under the trademark Tyvek TM, a trademark of DuPont de Nemours & Company, which is coated on one side by a polyethylene film. The olefin provides tear resistance, and the film prevents chemical penetration. While the patent does not discuss the arrangement of adjacent surfaces of a seam of two pieces of the material, it is believed implicit that film side-to-film side is employed. First, examining the arrangement in FIG. 4, it is noted that each of the two thicknesses are turned 180° to form facing surfaces, thus indicating that identical surfaces are mated. Second, normally, and as illustrated by Bibby U.S. Pat. No. 4,190,010, the film, less porous, side of a protective garment (waterproof) forms the outside of such a garment and, three, Tyvek TM is not directly heat bondable to another layer of Tyvek TM, this being indicated by its manufacturer.

The Goldstein patent acknowledges the desirability of providing additional seam strength, accomplishing this by the addition of a binding around the external edge region of the seam and securing this region by stitching. The patent asserts that by this technique, since the needle holes are outside of the ultrasonic welded portion, the latter provides an unbroken barrier to the introduction of any contaminant, it being presumed that this means that even if a contaminant would pass through the stitching holes that it could not reach the interior because of the welded portion.

There are, however, two problems with the structure of Goldstein. First, while it is true that there is a seal between the two turned-back layers of material which is inboard of the stitching, there are two unsealed paths on the outside of these sealed layers which extend from the inside of the garment to the stitches. This, of course, can provide a leakage path. Second, even if one can effect a seal of all three surfaces of the material at a weld or welded seam, by the vary mechanical arrangement of the seam, it is particularly vulnerable to stretching forces which can and are frequently applied by natural movements of the wearer of the garment. The stresses are very concentrated, being first on the inside edge of a weld. In view of the small area to which the forces are initially directed, they can readily be hundreds of pounds per square inch just by the manipulation of one's arms, assuming a sleeve member is involved. As will be noted, initially, the sewn seam is not involved, and thus it provides no reinforcing pressure to hold the material together, with the result that with continued stretching forces, the weld is broken back to the point of sewing where sufficient resistance will probably be met to stop the tearing away process. Unfortunately, however, at this point, the seal of the weld no longer exists, and the remaining barrier, a sewn seam, is not liquid-proof.

Accordingly, it is the object of this invention to provide a significantly stronger seam and yet one which does not require sewing.

SUMMARY OF THE INVENTION

In accordance with this invention, a protective suit would be made of a fabric-film combination, an ideal fabric being Tyvek TM (a material manufactured and sold under this trademark by DuPont). The seam would be made by bringing the two edges of the material together from opposite directions, and necessarily with this approach, the materials are arranged film side-to-Tyvek TM side. This would not seem an extraordinary approach except for the fact that when one attempts to weld them together in an ordinary technique, such as by a continuous weld seam as employed by Goldstein (but film side-to-film side), the Tyvek TM appears to effect a migration or change in composition with the result that the welding attempt fails, the material literally coming apart at the point of weld. Perhaps that is the reason that Goldstein stayed with a film-to-film weld, although not an entirely satisfactory one, as he notes. In any event, the applicant has determined that by the combination of a continuous application of ultrasonic heating and spaced application of pressure that a continuous bond is effected, it being both unnecessary and, in fact, undesirable to provide continuous pressure. It appears that the graduations in stresses that inherently occur in between applied areas of pressure create regions of enhanced bonding strength, and at the same time the bonding effected is sufficiently continuous as to prevent leakage.

BRIEF DESCRIPTION OF THE DRAWINGS

FIG. 1 is an elevational view of a protective suit as contemplated by this invention.

FIG. 2 is an enlarged cross-sectional view taken along line 2—2 of FIG. 1.

FIG. 5 is a generally diagrammatic illustration of an ultrasonic type welding apparatus as employed in the welding of seams positioned as shown in FIGS. 2–4.

FIG. 5a is an enlarged partial view of a portion of FIG. 5.

FIG. 7 is a cross-sectional view showing a modification of a structure of FIG. 3 in which a strip has been added.

FIG. 8 is a cross-sectional view showing a modification of FIG. 4 in which a strip has been added.

DESCRIPTION OF THE PREFERRED EMBODIMENT

Referring to FIG. 1, the present invention generally contemplates the construction of a protective garment or suit 10 having a sealable, zipper-locked opening (not shown) generally covered by a protective flap 12. Suit 10 is constructed of a laminated material having as an inner layer a fabric-type material, such as Tyvek TM, and as an outer layer a chemical-resistant film, such as polyethylene or Saranex TM, a film manufactured and sold under this trademark by Dow Chemical Company. Significantly, in the construction of such a suit, various seams must be sewn, notably in leg units 14 and 16 and arm units 18 and 20. Obviously, a seam contemplates a break of some character in the continuity of material and where, as in the case of a protective garment, there must be no loss in the protective cover, or insignificantly so, the seam must be near perfectly made.

Figure 3:
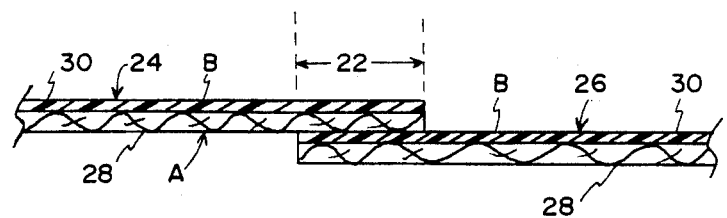
FIG. 3 is an enlarged partial view of FIG. 2.

FIG. 2 illustrates generally the tubular construction of an arm 20 of suit 10 and particularly illustrates the creation of a seam in accordance with this invention. It contemplates an overlapping region 22 of a first region or thickness 24 of material with a second region or thickness 26 of the same material, an enlarged view of which is illustrated in FIG. 3. As stated, the material of suit 10 is formed of an inner layer of Tyvek TM 28 to which there has been bonded an outer layer of film 30, this film being one which is, of course, bondable to the Tyvek TM and is generally impervious to such hazardous chemicals as a suit wearer might expect to encounter. As stated above, one such film is polyethylene and another is Saranex TM, a composite film including an inner layer of polyvinylidine chloride. Regardless of the bondable film employed, it will be on the outside. As is to be noted in the drawings, a Tyvek TM surface A of edge region 24 is positioned over a mating surface B of film of edge region 26. There are now overlapped areas of film material to Tyvek TM.

The next step in the process is to selectively apply a heat and pressure influence to the overlapped material, the former being accomplished by ultrasonic radiation. Unfortunately, if one attempts to make a seam closing of a tubular configuration as best illustrated in FIG. 2, at present there is no known ultrasonic welding machine that is configured to effect such welding. A general illustration of conventional ultrasonic welder 32 is shown in FIG. 5, and it is to be noted that its elements form a closed configuration except for a single opening 34 through which material may be fed. Thus, it is to be seen that a closed circle would not fit around elements of the welding machine and that a seam cannot be constructed which would entail doing this.

Figure 4:
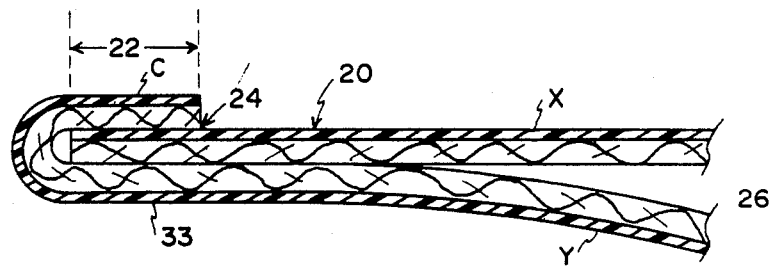
FIG. 4 is an enlarged partial view of a portion of a sleeve as illustrated in FIG. 2 but with an added fold of the material.

To solve the structural problem, and as a feature of this invention, the material is folded as shown in FIG. 4 to create a third thickness 33 of the material across overlapped region 22, and as folded, the material is fed through ultrasonic welder 32 as shown in FIG. 5. Ultrasonic welder 32 is conventional and employs an ultrasonic generator 36 which generates a sound vibrational signal of approximately 20 KHz at a power of approximately 350 watts which is transmitted upward by transducer 38 through rotary table 40 supported by shaft 41 and conventional bearing 42. Radiation then passes up through the material of sleeve 20 to be joined by a seam. To accomplish this, the material is moved through welder 32 coordinate with the rotation of wheel 44, driven by motor 46, typicaly fed by a feed member not shown. Pressure is applied to an upper surface C of thickness 22 by wheel 44 of welder 32, typically formed of metal, and is approximately two inches in diameter and approximately 0.6 inch wide. It has two spaced sets of four rows of serially arranged raised regions or lands 48, being approximately 0.02 inch in height, 0.12 inch long, and 0.04 inch wide. The length or circumferential spacing between these lands is approximately 0.03 inch and the lateral spacing between sets of rows being 0.04 inch and between rows of lands of a set of rows being 0.02 inch. A variable downward force in the approximate range of 20 to 35 pounds is applied by a spring, diagrammatically illustrated as spring 50, providing an effective force via the lands of 500 to 1,000 PSI as needed for the material used. Two passes of the material are typically made, creating a weld approximately 0.6 inch in width. There is also created an unwanted bond between overlapped or folded thicknesses 26 and 33 in region 22, being a Tyvek TM-to-Tyvek TM connection. Fortunately, this latter joint is a weak one, and by pulling on regions of the sleeve back at, say, points X and Y, this latter joint will give way to a state where portions of sleeve 20 are separated, this being illustrated in FIG. 6 showing as region 22a the former position of a bond.

Figure 6:
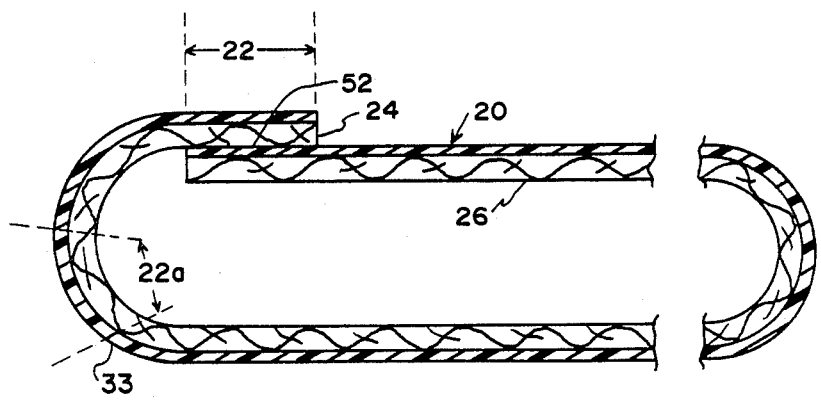
FIG. 6 is an enlarged partial view of the sleeve processed by the welder as shown in FIG. 5 and after a folded portion has been pulled away.

Significantly, it is to be seen that if one attempts to stretch the inside of sleeve 20 as shown in either FIGS. 2, 3, or 6 that the full welded area of the seam 52 resists this force, it extending over the overlapping welded region of approximately 0.6 inch. As a result, the mechanical strength of the seam is tremendous, and it is simply not destroyable by anticipated muscular forces exertable on the inside of the sleeve. This is in contrast to a seam of the arrangement illustrated by Goldstein, wherein, as can be seen from FIG. 4, by pulling on members 14 and 16 in opposite directions, one applies essentially all force on an extremely small area of connection, and as it gives, these small areas of stress cause the material to yield and the seam commences giving away. This can occur at levels of force to be anticipated in the ordinary usage of a garment. In any event, the focus of the forces are moved along until a seam finally breaks back to the stitched regions. When this occurs, there is the propensity for leakage through the stitches, a problem long existing where stitched seams have been attempted in protective garments and presently a very real problem where stitches are relied upon for strength of a seam.

Again referring to the construction of a seam as contemplated by this invention, while it might have been thought that to apply spaced increments of pressure as accomplished by the lands 48 of pressure wheel 44 would leave unsealed regions in between, it has been found that to the contrary, the configuration appears to effect a continuous sealing effect not achievable with a continuous pressure wheel. In fact, with a continuous application of pressure (as it appears was employed by Goldstein to a film-to-film joint) to a Tyvek TM-to-film joint, a breakdown will occur in the structure of the material, this producing voids which actually break through the material. In fact, it may have been such an obstacle that lead to the film-to-film welding employed by Goldstein. Significantly, the mechanical arrangement of the Goldstein seam makes it inherently weak and creates the necessity for adding the stitching step. Clearly the seam constructed in accordance with applicant's invention will provide a more effective seal than employed by the combination of a film-to-film plus a stitching arrangement. On the other hand, where extreme fluid pressues are to be encountered and further assurances sought as to the integrity of the seam, it is possible to further reinforce one of applicant's seams. Thus, FIG. 7 illustrates the application of a strip or thickness 54 of protective material, e.g., bondable film, applied over a seam 50 between end regions or thicknesses 24 and 26, this strip typically being of a film such as Saranex TM.

FIG. 8 illustrates a strip 56 positioned on the inside of a seam, and in this case, it typically would be a strip of film-coated Tyvek TM. In the latter case, there would thus be three thicknesses of material.

From the foregoing, it is to be well appreciated that the applicant has provided a major step forward in the construction of safe protective garments which provide an increased margin of safety for the wearer which it is believed will play a major role in enhancing capabilities in safely working in hazardous environments as, for example, those created by toxic chemicals.

The invention claimed is:

1. A protective garment comprising:

a material formed of bonded layers including as a first and inner layer a spun bonded olefin and as a second and outer layer a bondable film from the group of films wherein one film includes polyethylene and the other film includes polyvinylidine chloride;

an inner surface, surface A, of said material being a surface of said spun bonded olefin and the outer surface, surface B, of said material being a surface of said bondable film;

first and second tubular sleeves, each formed of an elongated portion of said material and wherein each sleeve is configured by overlapping side edge regions of said elongated portion, a surface A of one side edge region forming a first thickness of material, lying flat against a surface B of the other side edge region forming a second thickness of material; and a bonded, sealed, joint between said overlapped side edge regions of said material, bonding being effected continuously by applying ultrasonic energy through said overlapping side edge regions of said first and second thicknesses of material and simultaneously applying pressure to said overlapped side edge region, said pressure being applied at predetermined spaced intervals on serially spaced areas along the said side edge region of said material wherein the combination of adjacent conditions of applied heat and pressure, and heat only, is effected in said side regions and a continuous seal is effected.

2. A protective garment as set forth in claim 1 wherein a third thickness of said elongated portion of said material is folded to effect in place three thicknesses of said material before bonding and wherein surface A of the third thickness faces a surface A of said other side edge region, then said heat and pressure are applied through the three thicknesses, permanent bonding being effected between said surface A of one side region of said elongated portion and said surface B of said other side region of said elongated portion, and ineffectual, disconnectible, bonding occurs between surface A of said third thickness of material and surface A of said other side edge region of a said second thickness of material.

3. A protective garment as set forth in claim 1 further comprising a strip of material including a bondable film, and said strip being positioned as an added thickness over and overlapping the intersection of said first and second thicknesses of material.

4. A protective garment as set forth in claim 1 wherein said film comprises an inner layer of polyvinylidine chloride.

5. A protective garment as set forth in claim 2 wherein said film comprises an inner layer of polyvinylidine chloride.

6. A protective garment as set forth in claim 1 wherein said pressure is applied at said predetermined intervals by a wheel having a plurality of spaced lands for serially engaging said overlapped side regions on said areas at said intervals.

7. A protective garment as set forth in claim 6 wherein said pressure is in the range of 500 to 1,000 PSI.

8. A protective garment as set forth in claim 7 wherein said wheel is approximately two inches in diameter, and the area dimensions of a said land are approximately 0.12 inch by 0.04 inch.

9. A protective garment as set forth in claim 6 wherein said wheel is approximately two inches in diameter, and the area dimensions of a said land are approximately 0.12 inch by 0.04 inch.

10. A protective garment as set forth in claim 8 wherein said lands are approximately 0.02 inch in height, and the circumferential spacing of lands is approximately 0.03 inch.

11. A protective garment as set forth in claim 9 wherein said lands are approximately 0.02 inch in height, and the circumferential spacing of lands is approximately 0.03 inch.

* * * * *